Oct. 6, 1964   O. H. SCHUCK   3,151,487
ACCELEROMETER
Filed Sept. 13, 1961   4 Sheets-Sheet 1

*INVENTOR.*
OSCAR HUGO SCHUCK
BY Roger W. Jensen
ATTORNEY

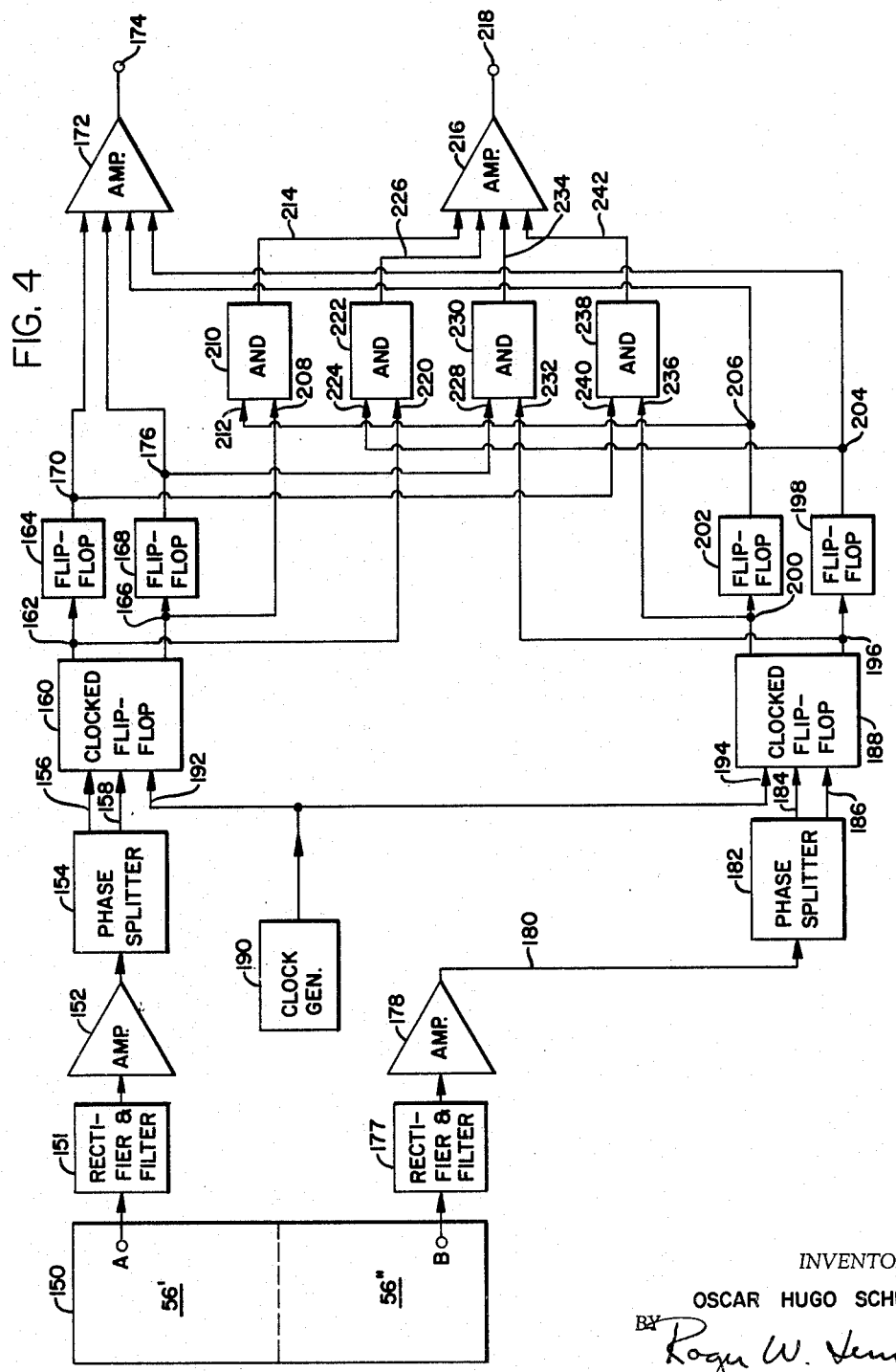

United States Patent Office 3,151,487
Patented Oct. 6, 1964

3,151,487
ACCELEROMETER
Oscar Hugo Schuck, Minneapolis, Minn., assignor to Honeywell Inc., a corporation of Delaware
Filed Sept. 13, 1961, Ser. No. 137,912
10 Claims. (Cl. 73—517)

This invention pertains generally to a device for measuring distances by the use of acoustical signals. More specifically this invention uses sound waves to measure the displacement of an accelerometer and to provide outputs that a digital computer can readily use.

One embodiment of this invention uses two variable frequency oscillators which are connected to transducers on either end of an accelerometer. These variable frequency oscillators each oscillate at a frequency dependent upon the distance between its transducer and the seismic mass of the accelerometer. The difference in frequency between the two oscillators is determined by a frequency comparator which gives an output, analogue or digital, indicative of the difference in frequency between the two oscillators and, accordingly, of the displacement of the seismic mass and of the acceleration sensed.

A second embodiment uses only one variable frequency oscillator, and the frequency of this oscillator is indicative of the distance between the transducer and the seismic mass.

A third embodiment uses transducers on either end of an accelerometer to form standing waves between the transducer and the seismic mass and the output from each transducer is converted to a digital form such that the digital output is indicative of the number of standing waves which are formed and destroyed as the seismic mass is displaced, and thus of the acceleration sensed.

An object of the invention is to provide an improved acceleration sensing and signal producing apparatus.

It is a further object of this invention to provide a new and novel means of ascertaining the displacement of a seismic mass in an accelerometer.

Another object is to provide a novel means of measuring distance between two objects.

A further object is to provide an acceleration measuring device which provides a digital output signal.

Other more specific objects and features of the invention will appear in the following specifications and claims and the accompanying drawings of which:

FIGURE 4 is a block diagram of a circuit to convert the analog signals obtained from the third embodiment of the invention to a digital output;

Figure 1:
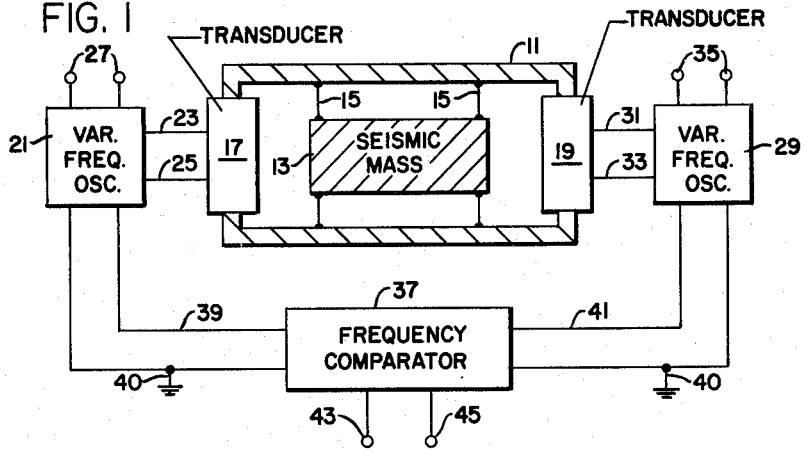
FIGURE 1 is a block diagram showing one embodiment of the invention for measuring the displacement of a seismic mass.

In FIGURE 1 a housing 11 is shown with a seismic mass 13 movably supported therein by wires or other suitable supporting means generally designated at 15. A first transducer means 17 and a second transducer means 19 are mounted on opposite ends of the housing 11. The transducer means 17 and 19 may be of any type which will transduce from acoustical energy to electrical energy and vice versa. One example would be of magnetostrictive type, suitably polarized and equipped with windings for compressional mode operation. A variable frequency oscillator 21 is connected to the transducer 17 by wires 23 and 25. Wires or terminal means 27 connect oscillator 21 to a power source (not shown). The power source would be a D.C. voltage in most embodiments. A second variable frequency oscillator 29 is shown connected to the transducer 19 by wires 31 and 33. The variable frequency oscillator 29 is shown with wires 35 which would be connected to a power source (not shown). A frequency comparator or computer means 37 is shown connected to the two variable frequency oscillators 21 and 29 by wires 39 and 41 respectively, with each oscillator connected to a ground 40. The frequency comparator 37 is shown with output terminals 43 and 45.

Figure 2:
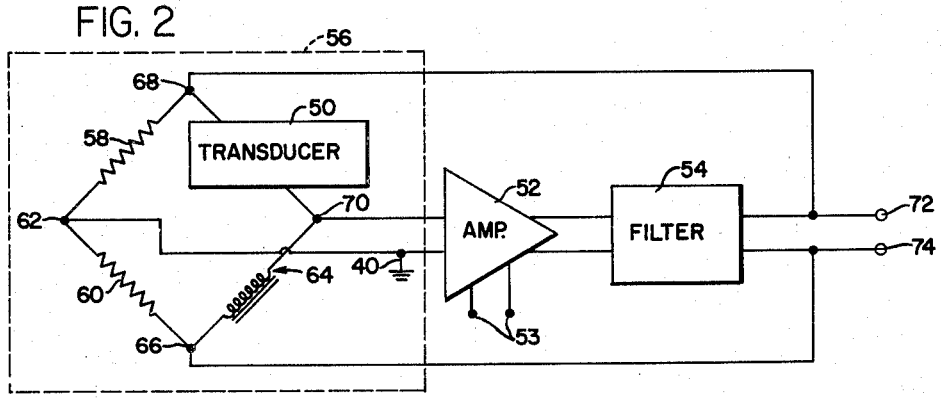
FIGURE 2 is a circuit diagram of the variable frequency oscillator connected to a transducer.

In FIGURE 2 the complete variable frequency oscillator is shown including a transducer 50, an amplifier 52, and a bandpass filter 54. The amplifier 52 is connected to a power source (not shown) by wires 53. A portion of FIGURE 2 is enclosed in dotted lines and is generally designated as 56 and may be designated as the acoustic interferometer accelerometer electronics or bridge circuit. Two resistors 58 and 60 are connected in series to form one side of the bridge circuit 56. The resistors 58 and 60 meet and connect at a junction point 62. The other end of resistor 60 connects to one end of an inductance 64 at a junction point 66. The resistor 58 terminates at a junction point 68 to which one lead of the transducer 50 is connected. The other lead of the transducer 50 connects to a junction point 70 and to the other end of the inductance 64. The amplifier 52 has its input leads connected to the junction points 62 and 70 of the bridge 56. The input lead of amplifier 52 which is connected to point 62 is also connected to ground 40. The output of the amplifier 52 is connected to the input of the filter 54. The filter 54 has a first output lead connected to a terminal 72 and a second output lead connected to a terminal 74. The terminal 72 is connected to the junction point 68 and the terminal 74 is connected to the junction point 66.

Figure 3:
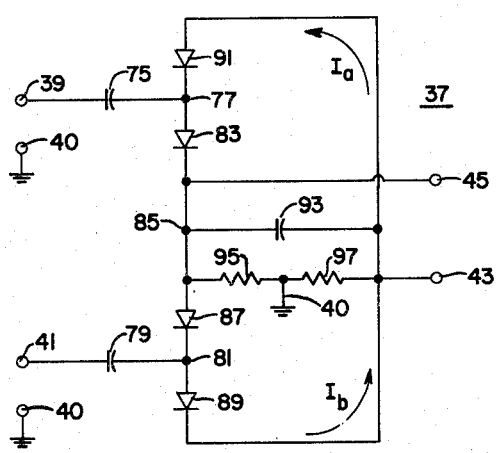
FIGURE 3 is a circuit diagram of an analog type of circuit for comparator 37 in FIGURE 1.

In FIGURE 3 an analogue type of frequency comparator 37 is shown in more detail and comprises one set of input leads 39 and 40 and a second set of input leads 40 and 41 which are also shown in FIGURE 1. Lead 40 is connected to ground and lead 39 is connected to a capacitor 75. The other lead of the capacitor 75 is connected to a junction point 77. The lead 40 at the second input is connected to ground and the lead or terminal point 41 is connected through a second capacitor 79 to a junction point 81. A diode 83 is connected between the junction point 77 and a junction point 85. A diode 87 is shown connected between the junction point 85 and the junction point 81. A diode 89 is shown connected between the junction point 81 and the junction point and output terminal 43. A diode 91 is connected between the junction point 43 and the junction point 77. The four diodes 83, 87, 89, and 91 are connected in a manner such that current flow will proceed from junction point 43 successively through junction point 77, 85, 81, and back to junction point 43. As further clarification, the cathode of each diode is connected to the anode of the following diode. A capacitor 93 is connected between the junction point 85 and the junction point 43. An output terminal 45 is the same as the junction point 85. A resistor 95 is connected between the junction point 85 and ground 40. A second resistor 97 is connected between junction point 43 and ground 40.

In FIGURE 4 a box 150 containing the bridge circuits for the acoustical interferometer accelerometer is shown divided into sub-boxes 56′ and 56″ and with output leads A and B respectively. The rest of the boxes shown constitute one type of computing means or analog to digital converter necessary to obtain an output signal usable by a digital computer. Terminal A is connected through a rectifier and filter unit 151 to an amplifier 152. The output of amplifier 152 is connected to an input of a discriminator or phase splitter 154. The discriminator has two outputs designated as 156 and 158 which are applied to a clocked flip-flop 160. A first output terminal 162 on the clocked flip-flop 160 is connected to a flip-flop 164. A second output terminal 166 of the clocked flip-flop 160 is connected to a flip-flop 168. An output lead 170 of the flip-flop 164 is connected to a first input of a summing amplifier 172. An output of the amplifier 172 is connected to an output terminal means 174. An output 176 of the flip-flop 168 is connected to a second input of the summing amplifier 172. Output terminal B on the subassembly 56" in the box 150 is connected through a rectifier and filter means 177 to an amplifier 178. An output 180 of the amplifier 178 is connected to a second discriminator or phase splitter 182. Two outputs 184 and 186 are connected from the discriminator 182 to two separate inputs on a clocked flip-flop 188. A clock 190 is shown connected to an input 192 on the clocked flip-flop 160 and to an input 194 on the clocked flip-flop 188. A first output 196 of the clocked flip-flop 188 is connected to an input of a flip-flop 198. A second output 200 from the clocked flip-flop 188 is connected to an input of a flip-flop 202. An output of the flip-flop 198 is connected to a junction point 204 and from there to a third input on tht summing amplifier 172. An output of the flip-flop 202 is connected to a junction point 206 and from there to a fourth input on the summing amplifier 172. The junction point 166 on the output of the clocked flip-flop 160 is connected to a first input 208 of an AND circuit 210. The output of the flip-flop 202 is connected to a second input 212 of the AND circuit 210. An output lead 214 of the AND circuit 210 is connected to a first input of a second summing amplifier 216. An output of the amplifier 216 is connected to an output terminal 218. The output of the clocked flip-flop 160 which is connected to the junction point 162 is connected to a first input 220 of an AND circuit 222. An output of the flip-flop 198 which is connected to the junction point 204 is connected to a second input 224 of the AND circuit 222. An output lead 226 of the AND circuit 222 is connected to a second input of the summing amplifier 216. An output of the flip-flop 168 which is connected to the junction point 176 is connected to an input 228 of an AND circuit 230. The output of the clocked flip-flop 188 which is connected to the junction point 196 is connected to a second input 232 of the AND circuit 230. An output lead 234 of the AND circuit 230 is connected to a third input on the summing amplifier 216. An output of the clocked flip-flop 188 which is connected to the junction point 200 is connected to a first input 236 of an AND circuit 238. The output of the flip-flop 164 which is connected to the junction point 170 is connected to a second input 240 of the AND circuit 238. An output lead 242 of the AND circuit 238 is connected to a fourth input on the summing amplifier 216.

Figure 5:
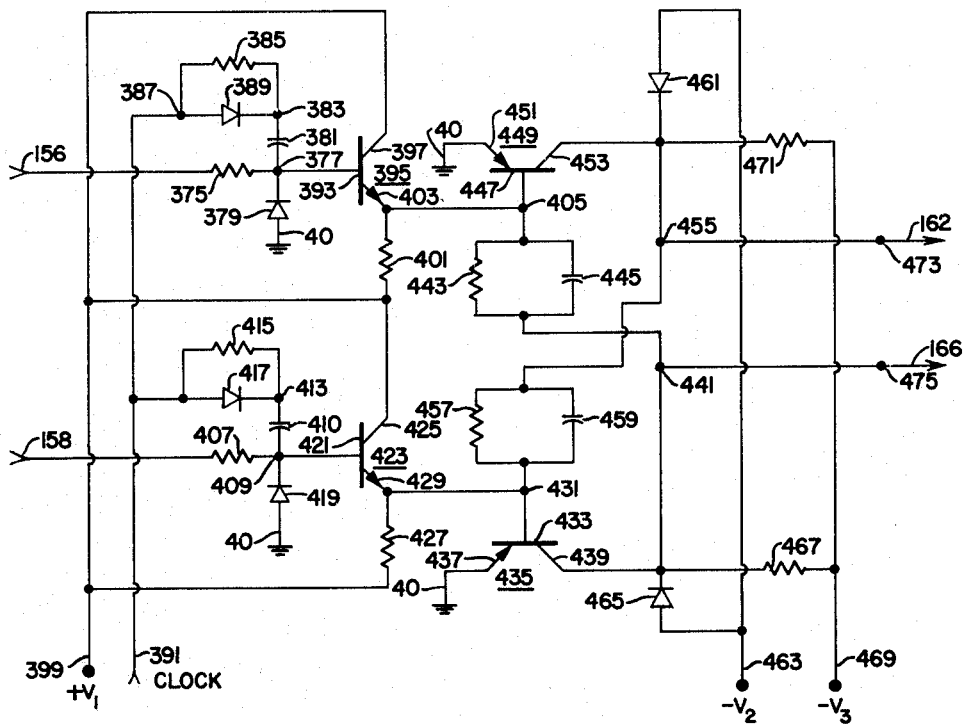
FIGURE 5 is a circuit diagram of one of the clocked flip-flops shown in FIGURE 4.

In FIGURE 5 a clocked flip-flop circuit is shown with input leads 156 and 158 corresponding to the same numbered leads in FIGURE 4. A resistor 375 is connected between the terminal 156 and a junction point 377. A diode 379 is connected between the junction point 377 and ground 40 with an anode lead connected to the ground 40 to permit current flow from ground to the junction point 377. A capacitor 381 is shown connected between the junction point 377 and a junction point 383. A resistor 385 is shown connected between the junction point 383 and a junction point 387. A diode 389 is shown connected between the junction point 387 and the junction point 383 in a manner to permit current flow from the junction point 387 to the junction point 383. The junction point 387 is connected to receive a pulse from the clock generator from a terminal 391. This would correspond to input lead 192 in FIGURE 4. The junction point 377 is connected to a base 393 of a NPN transistor 395. A collector 397 of the transistor 395 is connected to a power terminal 399 which in one embodiment of the invention is +6 volts. A resistor 401 is connected between the positive power terminal 399 and an emitter 403 of the transistor 395. Emitter 403 is connected to a junction point 405. The input terminal 158 is connected to one end of a resistor 407. A junction point 409 is connected to the other end of the resistor 407. A capacitor 410 is connected between the junction point 409 and a junction point 413. A resistor 415 is connected between the junction point 413 and the junction point 387. A diode 417 is connected between the junction point 387 and the junction point 413 in a manner to permit current flow from the junction point 387 to the junction point 413. A diode 419 is connected between the junction point 409 and ground 40 in a manner to permit current flow from the ground 40 to the junction point 409. The junction point 409 is connected to a base 421 of a NPN transistor 423. A collector 425 of transistor 423 is connected to the junction point 399. A resistor 427 is connected between the junction point 399 and an emitter 429 of the transistor 423. The emitter 429 of the transistor 423 is connected to a junction point 431. The junction point 431 is connected to a base 433 of a PNP transistor 435. An emitter 437 of the transistor 435 is connected to ground 40. A collector 439 of the transistor 435 is connected to a junction point 441. A resistor 443 is connected between the junction point 405 and the junction point 441. A capacitor 445 is also connected between the junction point 405 and the junction point 441. The junction point 405 is connected to a base 447 of a PNP transistor 449. An emitter 451 of the transistor 449 is connected to ground 40. A collector 453 of the transistor 449 is connected to a junction point 455. A resistor 457 is connected between the junction point 431 and the junction point 455. A capacitor 459 is also connected between the junction point 431 and the junction point 455. A diode 461 is connected between the junction point 455 and a negative power terminal 463 which in this embodiment of the invention is −6 volts. A diode 465 is connected between the junction point 441 and negative power terminal 463. A resistor 467 is connected between the junction point 441 and a second negative power terminal 469. In one embodiment the power terminal 469 is held at −12 volts. A resistor 471 is connected between the junction point 455 and the negative power terminal 469. The junction point 455 is connected to a first output terminal 473. The junction point 441 is connected to a second output terminal 475. The junction point 473 would correspond to and connect to the junction point 162 or the junction point 200 in FIGURE 5 and the output terminal 475 would correspond to and connect to the junction point 166 or the junction point 196 in FIGURE 5.

Figure 6:
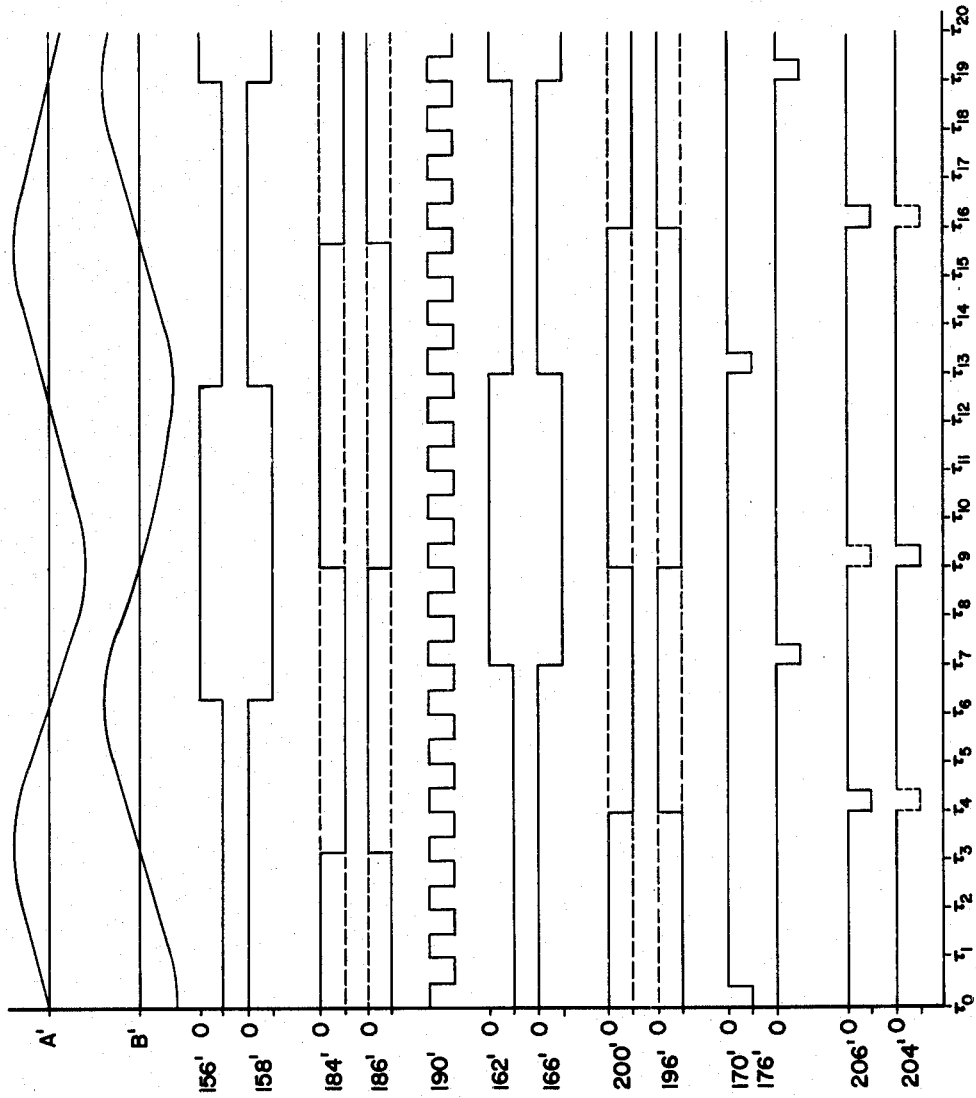
FIGURE 6 shows the waveforms at different points in FIGURE 4.

FIGURE 6 shows the waveforms of the signals at various points in FIGURE 4. The waveforms in FIGURE 6 are designated with a "prime" mark to indicate a waveform at a corresponding junction point.

Figure 7:
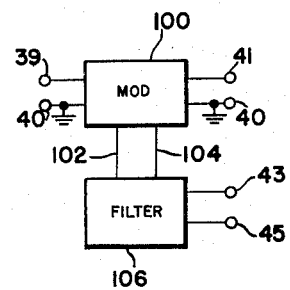
FIGURE 7 is a block diagram of a digital type of circuit for comparator 37 in FIGURE 1.

FIGURE 7 illustrates one type of digital circuitry for producing a digital output signal indicative of the difference in frequency of the two signals applied to frequency comparator 37 shown in FIGURE 1. The corresponding numbers in FIGURE 1 were also used in FIGURE 7 in that the input leads 39, 40, and 41 are marked with corresponding numbers and so are the output leads 43 and 45. The input leads are connected to a modulator or mixer stage 100 which may be of the ordinary ring modulator diode type known and commonly used by those skilled in the art. Leads 102 and 104 connect an output of the modulator 100 to inputs of a low-pass filter 106. The outputs of the low-pass filter 106 are connected to the terminals or junction points 43 and 45. This combination, of the modulator 100 and the filter 106, will provide a signal indicative of the difference in frequencies between the signals appearing at terminals 39 and 41 leading into the modulator 100. The output signal from the modulator is composed of several different frequencies and the signal of the lowest frequency is a signal of a frequency equal to the difference in input signal frequencies. The lowpass filter 106 filters out the rest of the frequencies and the noise signals to produce a signal at terminals 43 and 45 which is indicative of the difference in frequency between the two signals appearing at terminals 39 and 41. This circuit is an example of one of the many types of circuits which may be used to obtain a direct frequency so that a digital output may be obtained indicative of the difference in frequency between the two input signals.

*Operation*

In FIGURE 1 one embodiment for measuring the displacement of the seismic mass is shown. In this embodiment sound waves are produced by the transducer means 17 and 19 and are reflected off the seismic mass 13 to form standing waves. The transducers 17 and 19 show the highest impedance when a standing wave is formed between the transducer 19 or 17 and the seismic mass 13. When one side at a time is examined, it is found that the transducer 19 emits a sound wave which forms a standing wave between the seismic mass 13 and the transducer 19. The impedance looking into the transducer 19 at that moment appears as the highest possible value and the variable frequency oscillator 29 will oscillate at a frequency depending upon the impedance of the transducer 19. The oscillator 29 will oscillate at whatever frequency produces the greatest impedance in the transducer 19 since this produces the greatest input voltage to the oscillator 29. If the seismic mass 13 moves towards the end of the housing 11 where the transducer 17 is situated the distance between the transducer 19 and the seismic mass 13 becomes greater. With a greater distance between seismic mass 13 and the transducer 19 the standing wave frequency will become slightly lower. At the instant the seismic mass 13 moves, the impedance looking into the transducer 19 becomes lower and the output voltage is accordingly reduced. The variable frequency oscillator shifts frequency to obtain a high input voltage and the way that the greatest input voltage will be produced is to lower the frequency of the oscillator 29 and thus form a standing wave of a slightly lower frequency. If the seismic mass 13 comes closer to the transducer 19 the output voltage of the transducer 19 is again lowered slightly and of a phase such that the variable frequency oscillator 29 goes up in frequency and the impedance looking into transducer 19 is again as high as obtainable since a new, higher frequency standing wave is formed. The same conditions result from the variable frequency oscillator 21 and the transducer 17. It can thus be seen that while one oscillator goes lower in frequency the other oscillator goes to a higher frequency as the seismic mass is moved. The output of the oscillator 21 and the oscillator 29 is applied to inputs on the frequency comparator 37. The output from the frequency comparator 37 in one application of this embodiment of the invention is a D.C. voltage which changes amplitude and polarity if the two oscillators 21 and 29 are at the same frequency when the accelerometer is in a null position. If the two oscillators 21 and 29 are set at a predetermined frequency difference in the null condition, the output from the frequency comparator 37 may never change in polarity but only in amplitude. In another application, the digital output frequency comparator shown in FIGURE 7 may be more desirable.

A second embodiment of this invention uses just one of the variable frequency oscillators such as 29 in combination with one transducer such as 19. In this embodiment an output is obtained from the variable frequency oscillator 29 which is of a frequency dependent upon the distance between the seismic mass 13 and the transducer 19. This frequency change which is obtained upon a displacement of the seismic mass can be easily converted to digital form or any other usable output. If desired it can be applied to a frequency detector to give a D.C. output which varies in amplitude as a function of the input frequency. Other variations in information converters will also be readily ascertained by those skilled in the art for the particular application desired.

In FIGURE 2 the variable frequency oscillator circuit including a transducer is shown. The transducer 50 in FIGURE 2 is the same as the transducer 17 or the transducer 19 in FIGURE 1. As the transducer is excited at different frequencies, the impedance in the case of an electrical to acoustic transducer varies with the frequency produced and the environment within which the transducer 50 is contained. If the transducer 50 is a magnetostrictive type and is restrained from vibrating, the impedance of the transducer 50 will be the same as that of the inductance 64. The resistors 58 and 60 are matched resistors so that under conditions where the transducer 50 is restrained the output of the bridge circuit will be at a null. If the transducer 50 is free and the system shown in FIGURE 2 is turned on, noise will start the circuit. The noise applied to the amplifier 52 will produce an output of some frequency which, when applied to the bandpass filter 54, will produce an output within a certain frequency range which is applied to the bridge circuit 56 at terminals 66 and 68. This noise voltage when applied to the transducer 50 produces an output frequency which is the resonant frequency under the particular environment conditions existing at the time. While the point 62 will be held at a constant potential between the points 66 and 68, the junction point 70 will continually change from positive to negative with respect to the junction point 62 as the transducer 50 follows the sound wave variations. As acoustical energy is produced from the transducer 50, the impedance of the transducer 50 changes and an output signal is applied to the amplifier 52 to produce an even greater amplitude output than the noise produced. As this condition is regenerative, the amplifier 52 in a few cycles will be producing full amplitude output signals which are of a frequency depending upon both the bandpass filter 54 and a natural frequency of the transducer 50 operating in its environment. If the filter 54 were removed there might be several possible frequencies at which the transducer 50 could produce standing waves and therefore resonate and each time the circuit is turned on, the oscillator shown in FIGURE 2 could very well oscillate at a different natural resonant frequency. It is to be understood that FIGURE 2 is only one embodiment of the variable frequency oscillator which could be used and that this invention is not limited to this particular embodiment of a variable frequency oscillator.

In FIGURE 3 is shown one version of a frequency comparator which is shown as a block diagram in FIGURE 1 under the designation 37. In this circuit a signal applied at terminals 39 and 40 is applied through the capacitor 75 to the junction point 77 and the diodes 91 and 83. This circuit forms a voltage doubler which sends current around the loop through the resistors 95 and 97 in the direction indicated by the arrow $I_a$. The signal applied at terminals 40 and 41 is applied to a second voltage doubler using the diodes 87 and 89 to produce a current around the loop through the resistors 97 and 95 designated as $I_b$. As can be seen the two currents $I_a$ and $I_b$ flow through the resistors 95 and 97 in opposite directions. If the capacitors 75 and 79 are small enough to be completely charged during the time the pulses from the variable frequency oscillators 21 and 29 are applied and the applied pulse has a constant voltage E, the quantity of electricity stored will be equal to Q=EC. It can be seen that the rectified current $I_a$ will be equal to $ECN_1$ where $N_1$ is the frequency of the input signal in pulses per second appearing at the output of one of the variable frequency oscillators. Similarly, the current $I_b$ will be equal to $ECN_2$ where $N_2$ is equal to the frequency of the second input signal in pulses per second obtained from the output of the other variable frequency oscillator. The voltage developed across the resistors 95 and 97 is therefore proportional to the difference in the frequency of the two signals applied to the input terminals 39 and 41 respectively. The polarity of the voltage developed across these two resistors reverses as the frequency of one of the signals approaches and passes the frequency of the other signal.

A few informational remarks will be given prior to a discussion of the operation of FIGURE 4. The box 150 is shown in FIGURE 4 which contains two bridge circuits 56' and 56". These are essentially the same components as shown within the dotted portion 56 in FIGURE 2. The box 56' has power applied to the terminals 66 and 68 (not shown) and a power signal of the same frequency is applied to the box 56" (not shown) except that this power is 90 degrees out of phase with the signal applied to 56'. The particular analog to digital converter shown in FIGURE 4 requires a 90 degrees phase shift, however other types of analog to digital converters can be used in which a different amount of phase shift can be used and possibly even no phase shift can be used. In order to get a better realization of the output signal at terminals A and B on the box 150, reference will be made to FIGURE 1 again. If the bridge circuit 56 in FIGURE 2 including the transducer 50 is used to replace the transducer 19 in FIGURE 1, a sound or acoustical signal will be produced on a constant frequency at the output of the transducer 50. As the seismic mass 13 is displaced, standing waves will be formed between the transducer 50 and the seismic mass 13 at different positions of displacement. At other positions, the standing wave will be destroyed and the impedance of the transducer 50 will drop. This will cause a variation in the amplitude of a signal appearing at terminals 62 and 70. With the proper electronics, the exact distance or point between two standing waves may be determined from the phase angle of the output signal caused by the varying impedance of the transducer 50. If the same type of bridge circuit as 56 is mounted on the other end of the housing in FIGURE 1 in place of the transducer 17 and the power applied thereto is 90 degrees out of phase with the power applied to the transducer on the other end of the housing; and further if standing waves are formed by both transducers when the seimic mass is in a null position with power of the same frequency and phase applied; then the impedance of the two transducers will vary as standing waves are formed and destroyed and one of the transducers will obtain a maximum impedance either 90 degrees before or after the maximum impedance is formed at the other transducer when power of 90 degrees phase difference is applied to the bridge circuits, and the point of maximum impedance will depend upon the direction of movement of the seismic mass 13. If the number of standing waves or maximum impedance levels of transducers are counted, the displacement of the seismic mass can be determined by counting the number of standing waves produced to give an indication of displacement. The direction is determined by determining whether the formation of a maximum impedance level of one transducer leads or lags the other transducer.

Applying this information to the diagram in FIGURE 4, which is an overall diagram of a third embodiment of the invention, it can therefore be determined that the high frequency signal from terminal A on box 150 either leads or lags the signal at terminal B in amplitude. And if this high frequency signal is demodulated or rectified in the rectifiers and filters 151 and 177, the signals applied to the amplifiers 152 and 178 will be signals which vary in amplitude in a sinusoidal variation as the standing waves are formed and destroyed between the transducer and the seismic mass. These signals are shown in FIGURE 6 as waveforms A' and B' respectively. This signal will be of a frequency depending upon the displacement or rate of displacement of the seismic mass in the accelerometer. This signal will be amplified by amplifier 152 and applied to the discriminator 154. The amplifier 152 is a saturating amplifier which produces a square wave output so that the input to discriminator 154 is a square wave signal. The output signals on terminals 156 and 158 are also square wave signals which are 180 degrees out of phase. These signals are shown in FIGURE 6 as signals 156' and 158'. The clock pulse which is applied to the clocked flip-flop 160 is shown in FIGURE 6 as signal 190'. The signals applied to the flip-flop 188 on lines 184 and 186 are shown in FIGURE 6 as 184' and 186'. The clocked flip-flop 160 is adapted to change its output signal at the time when the pulse from the clock generator 190 is going positive immediately after the signal input from the discriminator 154 has changed conditions. If the clock pulse is of a high frequency compared with the frequency obtained from the bridge circuit or eventually from the discriminator 154, there will be very little time lag between the changed conditions of the discriminator output 156 and the output 162 of the clocked flip-flop 160. The output signals from the clocked flip-flop 160 are shown in FIGURE 6 as 162' and 166' respectively. The output signal from flip-flop 164 is shown in FIGURE 6 as 170'. This signal from the flip-flop 164 is summed into the amplifier 172 to produce an output at terminal 174 every time channel A produces an output signal. This signal occurs each time A' is midway between the maximum and minimum level or in other words at ground potential. Another way of saying this is that flip-flop 164 produces an output signal every time the channel A is halfway between its negative potential and its positive potential and proceeding towards the positive potential. When the transducer is proceeding from a positive or maximum impedance towards a minimum impedance the flip-flop 164 does not produce an output signal. When the signal at the point 162 goes in the positive direction, the signal at point 166 goes in the negative direction. The mono-stable flip-flop 168 is identical to the flip-flop 164 and it therefore produces an output pulse when its input goes in the negative direction and will therefore produce an output signal 180 degrees in phase-time relationship after the output pulse is produced from flip-flop 164. The output pulse from flip-flop 168 is also applied to the summing amplifier 172 so that an output pulse is now produced each time the transducer in the bridge 56' goes through ground potential. In summary, an output signal is produced from the flip-flop 164 when the output from bridge 56' is at ground potential going in a positive direction and an output signal is produced from the flip-flop 168 when the bridge 56' is producing an output signal near ground and going in the negative direction.

The signal output from channel 56" is shown as B' in FIGURE 6 after being rectified by the rectifier and filter box 177. This signal is acted upon by the various components in the same manner as the signal from the bridge 56'. The signal is amplified in the high gain saturating amplifier 178 and applied to the discriminator 182 which is separated into two components 180 degrees out of phase and applied to the flip-flop 188 which also has a signal applied to it at terminal 194 from the clock 190. The signals appearing at leads 184 and 186 are shown in FIGURE 6 as waveforms 184' and 186'. The clocked flip-flop is again triggered at the time that the signal from the clock generator 190 goes positive immediately after the signals applied on terminals 184 and 186 change condition to produce outputs on terminals 200 and 196 as shown in the FIGURE 6 in solid lines as signal waveforms 200' and 196'. The signals varying at points 200 and 196 are applied respectively to the monostable flip-flops 202 and 198. When the signals applied to the two flip-flops 198 and 202 go in the negative direction, output pulses are produced. Signals produced at points 206 and 204 are shown as 206' and 204' in FIGURE 6. The outputs from the flip-flops 202 and 198 are also applied to the amplifier 172 to produce output pulses at the terminal 174. It can thus be seen that an output appears at the terminal 174 every time one of the flip-flops 164, 168, 198, or 202 is triggered to a momentary ON condition. The boxes designated as 210, 222, 230, and 238 are diode logic circuits and produce outputs only when two negative pulses are applied simultaneously at the input. Whenever two negative pulses are applied to an AND circuit, an output is produced from the AND circuit and applied to the summing amplifier 216. The summing amplifier 216 applies the signal to the output terminal 218. The block diagram shown in this figure is arranged such that if the signal appearing from bridge 56' leads the signal appearing from bridge 56" output pulses will be produced at terminal 218 every time a pulse is produced at terminal 174. However, if the output from 56' lags the signal appearing from 56" no output will appear at 218 even though output pulses are continually appearing at terminal 174. From these two conditions an output will be obtained from the computer every time a midpoint has been reached between a maximum and minimum impedance of the transducer 50 and it can be determined from the fact that there are pulses at terminal 218 or are not pulses at terminal 218, the direction of movement of the seismic mass 13.

By following through the description given in this paragraph in conjunction with the FIGURES 4 and 6 a clear understanding of the operation of this circuit can be obtained. Soon after time $t_6$, channel A produces an output signal which is near ground potential, this changes the output of amplifier 152 and the discriminator 156 to produce a square wave as shown for signals 156' and 158'. These signals are applied to the clocked flip-flop 160 and the next time the clock pulse changes from negative to positive, which would be $t_7$ in this example, the clocked flip-flop changes the output polarity and produces the signal shown as 162' or 166'. If the signal 162' is observed, it will be noticed that this signal is applied to the flip-flop 164 to produce an output pulse at the time $t_{13}$ when this signal goes negative. This output pulse is produced at point 170 and through the amplifier 172 appears as an output pulse at terminal 174. The output pulse at 170 is also applied as an input to the AND circuit 238 at input 240. The other input 236 is taken from junction point 200 which, on the signal 200' shown in FIGURE 6 at the time $t_{13}$, is a positive signal and since the AND circuit 238 needs two negative signals simultaneously to produce an output, no output pulse is produced at the terminal 218. If however the seismic mass were being displaced in the opposite direction as indicated by the dashed lines in the waveforms from channel B', the output signal at terminal 200 would be the dashed signal shown in the waveform designated as 200'. When both the input signals at the AND circuit 238 are negative as shown in this second suggested condition, an output pulse will be produced on line 242 and an output signal will be obtained at the terminal 218. This condition can be followed through for each of the other conditions where the output from the bridge circuit 56 approaches and passes through ground potential.

Since the clocked flip-flop 160 or 188 is the only component in the analog to digital converter which is not of standard design, this is the only circuit which will be explained. This circuit is shown in FIGURE 5. In this circuit initial conditions of the flip-flop comprising the transistors 449 and 435 must be assumed before an explanation of what happens when the further input signal is applied can be described. If it is initially assumed that transistor 435 is in an ON condition and 449 is in an OFF condition, the terminal 475 will be at a point near ground while the terminal 473 is at a point approximately −10 volts when −12 volts is supplied to 469. In this condition, the base 447 of the transistor 449 is at a point slightly positive with respect to ground and so is the emitter 403 of the transistor 395. The circuit will now be examined under the assumption that the point $t_4$ in FIGURE 6 is the assumed condition. Terminal 156 will be negative with respect to ground and the point 377 will be slightly negative with respect to ground due to the drop from current flow through the diode 379. The clock pulses being applied at terminal 391 will give a positive pulse at the point 377 every time the clock pulse goes in the positive direction such as it does at points $t_4$, $t_5$, and $t_6$. This positive pulse will not be enough however to overcome the negative voltage produced by the diode 379 and the transistor 395 would stay in an OFF condition. Shortly after the time $t_6$, the input signal as shown in FIGURE 6 as 156' will change to a positive condition. When the input signal goes in the positive direction, the point 156 raises above ground and current stops flowing through the diode 379 to place the terminal 377 at ground potential. The capacitor then charges during the negative cycle of the clock pulse so that the lead of capacitor 381 which is connected to the junction point 377 is positive with respect to the lead connected to junction point 383. When the clock pulse goes in the positive direction, the point 377 is pushed far enough in the positive direction to turn the transistor 395 to an ON condition. This action brings the emitter voltage close to the collector 397 in voltage. The rise in voltage of the emitter 403 produces a similar rise in voltage on the base 447 of transistor 449. The positive pulse applied to the base 447 of the transistor 449 starts the transistor 449 toward a saturated ON condition. As the transistor 449 turns ON, the collector 453 drops in voltage to bring the junction point 455 closer to ground potential. As the junction point 455 is lowered in potential, the capacitor 459, which has been charged such that the lead connected to 455 is positive with respect to the lead connected to the junction point 431, applies a negative voltage to the base lead 433 of transistor 435. The negative applied signal starts to turn the transistor 435 to an OFF condition and raises the junction point 441 in voltage. The raising of the voltage at junction point 441 and lowering the voltage at junction point 455 is regenerative and the transistor 435 switches from an ON condition to an OFF condition and the transistor 449 switches from an OFF condition to an ON condition. The transistor 395 remains in an ON condition and the transistor 423 which previously had been in an ON condition is switched to an OFF condition. The clock pulses then have no further effect until just before time $t_{13}$ when the terminal 158 goes in the positive direction as shown in FIGURE 6 by waveform 158'. At time $t_{13}$ then a signal applied from the clock at junction point 391 turns the transistor 423 to an ON condition to switch the circuit back to the condition stated at the beginning of this description. The output signals of this clocked flip-flop then appear as the signals shown in FIGURE 6 as waveforms 162' and 166' corresponding to the output terminals 162 and 166 respectively.

The invention is not in the analog to digital converter. This is shown, however, to give an idea as to one form of obtaining a useful output from the idea of using standing acoustical waves to produce varying output signals as described in this invention. Many other embodiments can be produced to convert the analog signals to digital signals in a usable form and this invention is not intended to be limited to this particular converter.

Many different types of digital output frequency comparators will be easily apparent to those skilled in the art and it is not intended that this invention be limited to only the type shown. One example of a slightly different type digital output frequency comparator would be to use two counters which would count the frequency from each variable frequency oscillator and computer techniques would be utilized to subtract one frequency from the other and thereby produce an output signal in digital form which directly indicates the displacement of the seismic mass by a digital output which is directly indicative of the difference in frequency. Another way of accomplishing the result would be to measure the time duration between the points at which the two frequencies have in-phase components of their respective waveforms. This would produce greatest accuracy upon smallest displacements since the closer the two frequencies were to each other, the longer the period of time would be at which they would again be in phase with each other. As mentioned before, many other methods will be apparent and the particular system used will depend upon the accuracy required and the complexity and cost which can be withstood in any particular application.

While I have shown and described three embodiments of this invention, further modification and improvements will occur to those skilled in the art. I desire it to be understood, therefore, that this invention is not limited to the particular form shown and described and I intend in the appended claims to cover all modifications which do not depart from the spirit and scope of this invention.

What I claim is:

1. In an acceleration measuring device: housing means; seismic mass means compliantly supported by wires within said housing means and arranged to be displaced in either of two oppositely opposed directions; first and second variable frequency oscillator means comprising: first and second transducer means mounted on opposing ends of said housing means, arranged to correspond with a line of movement of said seismic mass means, and adapted to produce standing waves in the medium between said transducer means and the opposed surfaces of said seismic mass means of frequencies corresponding to the distances between said transducer means and said seismic mass means, first bridge circuit means including said first transducer means as one leg of said first bridge circuit means, said first bridge circuit means being adapted to give as an output signal a signal dependent in amplitude upon the variation in impedance of said first tranducer means, second bridge circuit means including said second transducer means as one leg of said second bridge circuit means, said second bridge circuit means being adapted to give as an output signal a signal dependent in amplitude upon the variation in impedance of said second transducer means, first amplifying means including input and output means connected to receive said output signal from said first bridge circuit means, second amplifying means including input and output means connected to receive said output signal from said second bridge circuit means, first bandpass filter means including input and output means connected to receive said output signal from said first amplifying means and connected to supply power to said first bridge circuit means, second bandpass filter means including input and output means connected to receive said output signal from said second amplifying means and connected to supply power to said second bridge circuit means; and frequency comparator means including input and output means, connected to receive said output signals from said first and second variable frequency oscillator means and adapted to provide an output signal indicative of a difference in frequency between said output signals of said first and second variable frequency oscillator means.

2. In an acceleration indicating device; housing means; seismic mass means compliantly supported within said housing means and arranged to be displaced in either of two directions; first and second variable frequency oscillator means comprising: first and second transducer means mounted on said housing means so as to be oppositely displaced with respect to said seismic mass means and adapted to produce standing waves between said transducer means and said seismic mass means of frequencies corresponding to the distances between said transducer means and said seismic mass means, first bridge circuit means including said first transducer means as one leg of said first bridge circuit means and input and output means, second bridge circuit means including said second transducer means as one leg of said second bridge circuit means and input and output means, first amplifying means including input and output means connected to receive said output signal from said first bridge circuit means said output means being connected to said input means of said first bridge circuit means and also serving as output means for said first oscillator means, second amplifying means including input and output means connected to receive said output signal from said second bridge circuit means, said output means being connected to said input means of said second bridge circuit means and also serving as output means for said first oscillator means; and frequency comparator means including input and output means, connected to receive said output signals from said first and second variable frequency oscillator means and adapted to provide an output signal indicative of a difference in frequency between said output signals of said first and second variable frequency oscillator means.

3. In movement measuring apparatus: housing means; seismic mass means compliantly supported by wires within said housing means and arranged to be displaced in either of two oppositely opposed directions; first and second variable frequency oscillator means including output means, said oscillator means also including first and second transducer means mounted on said housing means so as to be oppositely displaced with respect to said seismic mass means and adapted to produce standing waves between said transducer means and said seismic mass means of a frequency corresponding to the distance between said transducer means and said seismic mass means, the frequency changing as a function of distance between said transducer means and said seismic mass means; and means connected to receive said output signals from said first and second variable frequency oscillator means and adapted to provide an output signal indicative of a difference in frequency between said output signals of said first and second variable frequency oscillator means.

4. In measuring apparatus; mass means; first and second variable frequency oscillator means including output means, said oscillator means also including first and second transducer means mounted adjacent opposite portions of said mass means, and said oscillator means and said transducer means being adapted to produce standing waves between said transducer means and said mass means of a frequency corresponding to the distance between said transducer means and said mass means; and means connected to receive said output signals from said first and second variable frequency oscillator means and adapted to provide a digital output signal indicative of a difference in frequency between the output signals of said first and second variable frequency oscillator means.

5. In acceleration measuring apparatus: movable mass means suspended to freely move in at least one direction; transducer means arranged to direct a sound wave toward said mass means in the direction of movement for the purpose of producing standing waves indicative in frequency of the distance between said mass means and said transducer means; variable frequency oscillator means including said transducer means as a part of said oscillator means, said variable frequency oscillator means producing as an output signal a signal of a frequency which is indicative of the distance between said mass means and said transducer means; and computer means connected to receive said output signal from said variable frequency oscillator and adapted to provide a digital output signal indicative of the frequency of said variable frequency oscillator.

6. In an accelerometer indicating device: housing means; seismic mass means movably supported within said housing means; first and second transducer means situated to produce standing waveforms between said seismic mass and said first and second transducer means when said transducer means are properly energized; first bridge circuit means including said first transducer means and adapted to provide varying output signals as standing waves are produced and destroyed; second bridge circuit means including said second transducer means and adapted to provide varying output signals as standing waves are produced and destroyed; first means connected to said first bridge circuit for providing energy to said first bridge circuit; second means connected to said second bridge circuit for providing energy to said second bridge circuit, said energy provided by said second means being maintained at a predetermined phase relationship with respect to said energy provided by said first means; first and second rectifying means connected to said first and second bridge circuit means respectively and each adapted to give an output signal indicative of an input signal provided by said bridge circuit means; and computer means adapted to give a first output signal at a first output terminal means every time a predetermined voltage on the output signal from said first and second rectifying means is attained, said computer means also being adapted to give a second output signal at a second output terminal means when said seismic mass moves in a first direction and causes signals of one phase relation to occur between said output signals from said rectifying means and to give no output signal at said second output terminal means when said seismic mass moves in a second direction to cause a second phase relation to occur between said output signals from said rectifying means.

7. In an accelerometer indicating device: housing means being characterized by having first and second ends therein; seismic mass means movably supported within said housing; first and second transducers placed in close proximity to said first and second ends respectively of said housing means and situated in a manner to transmit and receive reflected sound waves from an energizing means connected to said first and second transducers; first and second pickoff means connected to said first and second transducer means and adapted to give an indication each time a standing wave is generated between said transducers and said seismic mass means; phase shifting means connected between said energizing means and said first transducer means; and computing means connected to said first and second pickoff means and adapted to give an output indicative in sense and magnitude of the movement of said seismic mass in distance and direction by comparing time relations of said indications produced by said first and second pickoff means and the number of said indications from a null position.

8. In a movement indicating device: housing means being characterized by having first and second ends, and mass means movably supported within said housing; first and second transducers placed in close proximity to said first and second ends respectively of said housing means and situated in a manner to produce standing sound waves between said transducer and said mass means using energy from an energizing means connected to said first and second transducers; first and second pickoff means adapted to give an indication each time a standing wave is generated between said transducers and said mass means and connected to said first and second transducer means; and computing means connected to said first and second pickoff means and adapted to give an output indicative of the movement of said mass means in distance and direction by comparing time relations of said indications produced by said first and second pickoff means and the number of said indications from a null position.

9. In an accelerometer indicating device: housing means; mass means movably supported within said housing means; first and second transducer means supplying a constant frequency output and situated adjacent opposite portions of said mass means to produce standing waves between said mass means and said first and second transducer means when said transducer means is properly energized; first bridge circuit means including said first transducer means adapted to provide varying output signals as standing waves are produced and destroyed due to movement of said mass means; second bridge circuit means including said second transducer means and adapted to provide varying output signals as standing waves are produced and destroyed due to movement of said mass means; and computer means connected to said first and second bridge circuit means and adapted to give an output signal indicative of direction and amplitude of movement of said mass means.

10. In an accelerometer indicating device: housing means; mass means movably supported within said housing means; transducer means supplying a substantially constant frequency acoustical output and situated to produce standing waves between said mass means and said transducer means when said transducer means is properly energized; bridge circuit means including said transducer means adapted to provide varying output signals as standing waves are produced and destroyed due to movement of said mass means; and computer means connected to said bridge circuit means and adapted to give an output signal indicative of direction and amplitude of movement of said mass means.

References Cited in the file of this patent

UNITED STATES PATENTS

| | | |
|---|---|---|
| 2,536,025 | Blackburn | Jan. 2, 1951 |
| 2,661,714 | Greenwood | Dec. 8, 1953 |
| 2,728,868 | Peterson | Dec. 27, 1955 |
| 2,862,200 | Shepherd | Nov. 25, 1958 |
| 2,869,851 | Sedgfield | Jan. 20, 1959 |
| 2,948,152 | Meyer | Aug. 9, 1960 |
| 2,984,111 | Kritz | May 16, 1961 |